BEST AVAILABLE COPY

129412

Feb. 17, 1942. R. J. NEBESAR Re. 22,029

AIRPLANE OR THE LIKE

Original Filed March 10, 1941

Inventor

Robert J. Nebesar

By Stevens and Davis

Attorneys

Reissued Feb. 17, 1942

Des. Re. 22,029

BEST AVAILABLE COPY

UNITED STATES PATENT OFFICE 22,029

DESIGN FOR AN AIRPLANE OR THE LIKE

Robert J. Nebesar, Bristol, Va.

Original No. 129,412, dated September 9, 1941, Serial No. 99,482, March 10, 1941, for 14 years. Application for reissue November 21, 1941, Serial No. 104,246

Term of patent 14 years

*To all whom it may concern:*

Be it known that I, Robert J. Nebesar, a citizen of Czechoslovakia, residing at Bristol, in the county of Washington, in the State of Virginia, have invented a new, original, and ornamental Design for an Airplane or the like, of which the following is a specification, reference being had to the accompanying drawing forming a part thereof.

Figure 1:
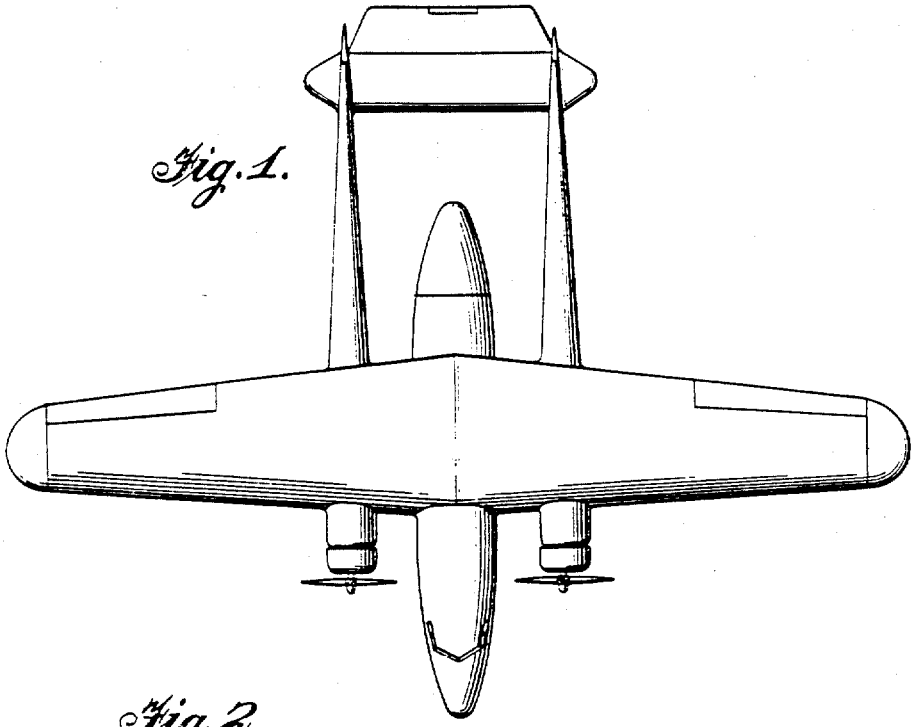
Figure 1 is a top plan view of an airplane showing my new design.
Figure 2:
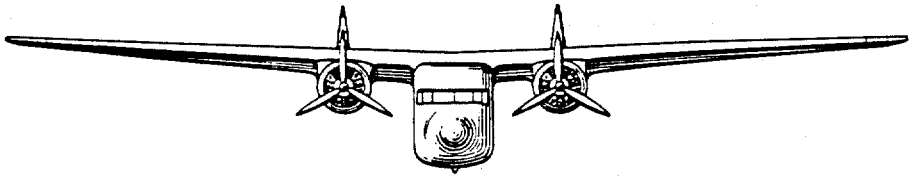
Figure 2 is a view in front elevation of the airplane shown in Figure 1 as it appears in flight.
Figure 3:
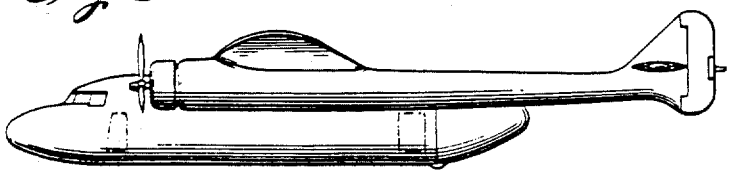
Figure 3 is a view from side elevation of the airplane shown in Figure 1 as it appears in flight.

I claim:

The ornamental design for an airplane or the like, substantially as shown.

ROBERT J. NEBESAR.